(No Model.)
H. W. LIBBEY.
BICYCLE.
No. 596,275. Patented Dec. 28, 1897.
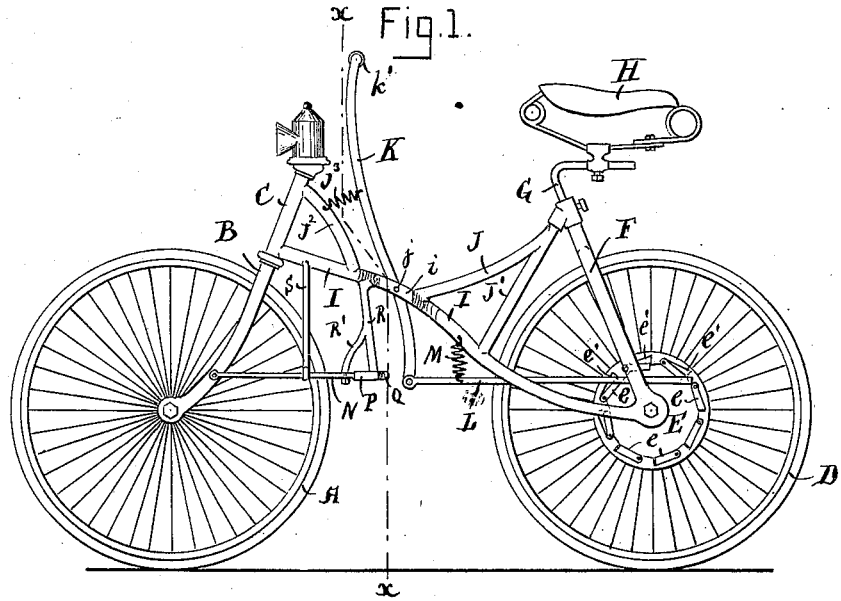
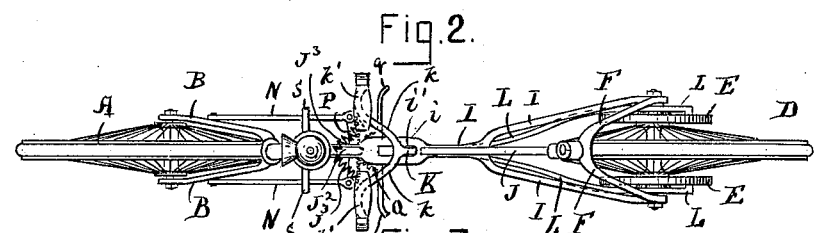
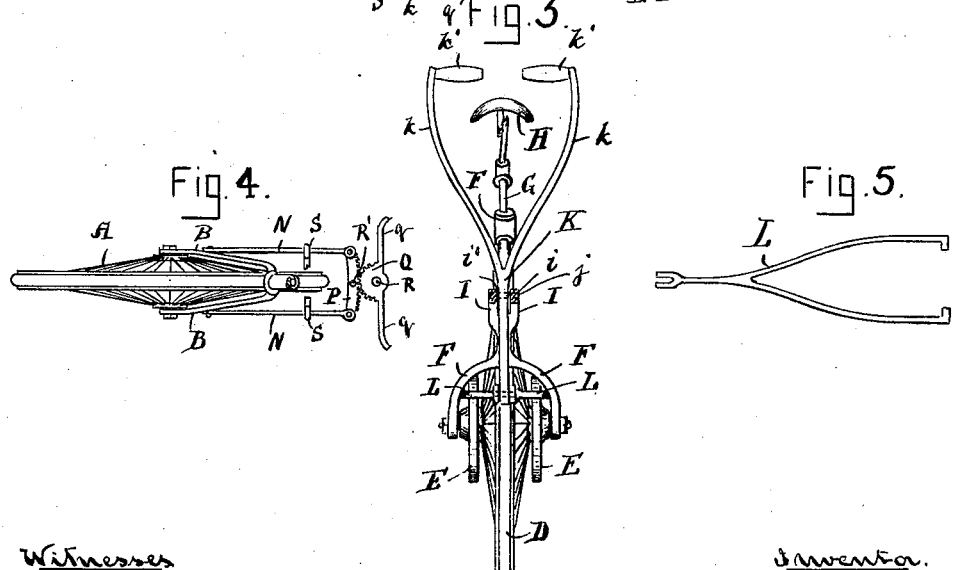
Witnesses
Inventor
Hosea W. Libbey
by Edwin Planta
Attorney

UNITED STATES PATENT OFFICE.

HOSEA W. LIBBEY, OF BOSTON, MASSACHUSETTS.

BICYCLE.

SPECIFICATION forming part of Letters Patent No. 596,275, dated December 28, 1897.

Application filed August 17, 1896. Serial No. 602,997. (No model.)

*To all whom it may concern:*

Be it known that I, HOSEA W. LIBBEY, a citizen of the United States, and resident of Boston, in the county of Suffolk and State of Massachusetts, have invented certain new and useful Improvements in Bicycles, of which the following, taken in connection with the accompanying drawings, is a specification.

The object of my invention is to produce a bicycle propelled by a rowing motion, so that the body will be exercised the same as in rowing a boat; and the invention consists in the peculiar means for propelling and steering, and also in certain details of construction, as hereinafter fully described, and pointed out in the claims.

Referring to the accompanying drawings, Figure 1 represents a side view of a rowing-bicycle embodying my invention. Fig. 2 is a plan or top view of same. Fig. 3 is a vertical section taken on line $x\ x$ of Fig. 1. Fig. 4 is a plan view of the steering apparatus. Fig. 5 is a view of the propelling-rod.

A represents the front or steering wheel, mounted in a fork B, supported in a head C in the usual manner.

D is the rear or driving wheel, mounted loosely upon its axle. To each side of the hub is secured a circular pawl-carrier E. These pawl-carriers each consist of a disk having an outwardly-projecting flange formed on its inner face with a series of angular recesses $e'$, said recesses being fitted with pawls $e$, fulcrumed at their forward ends to pins on the pawl-carrier, so that the pawls on the upper side will fall out of their recesses, while those on the under side will fall into their recesses and thus form, as it were, part of the flange.

The axle of the driving-wheel and pawl-carrier is mounted in a fork F, in the upper end of which is secured the bar G, carrying the saddle or seat H, which may be of ordinary construction.

I is the backbone connecting the head C and fork F. Said backbone is forked at its rear end to pass on each side of the wheel D, where it is connected to the fork F at the axle portion of same. From the backbone I extend two braces J J' for supporting the upper end of the rear fork F, and also a brace $J^2$ for supporting the head C.

The backbone I is at about the center between the wheels formed with an enlargement $i$, having a central opening $i'$, through which passes a long lever K, which is fulcrumed therein at $j$. The upper end of this lever is split and branches out on each side, as shown in Fig. 3, to form two arms $k\ k$, to the upper ends of which are secured inwardly-projecting handles $k'$, and to the lower end of said lever K is attached one end of a forked piece L, (the fork straddling the wheel D,) the outer ends of which are bent inward at right angles, so as to come in contact with the ends of the pawls $e$. This forked piece L is held up, so that its ends will be readily engaged with said pawls $e$, by a spiral spring M, attached to said fork-piece L and backbone I, so that when the machine is in position indicated the rider drawing the handles back or toward him will cause the fork-piece L to be drawn forward, and as the ends of said forked piece are in contact with one of the pawls on each side a rotary motion will be imparted to the pawl-carrier E and driving-wheel D, the ends of the forked piece being kept in contact with the pawls by said spring M. When the rider has drawn the handles sufficiently far back, they are drawn forward by springs $J^3$, thus returning the forked piece L ready to take hold of another pair of pawls, the momentum obtained by one stroke being sufficient to carry the vehicle forward until another stroke can be made.

In order to steer the machine, I pivot to each arm of the fork B a rod N, that extends rearward, and their outer ends are pivoted to a toothed quadrant P in gear with a toothed quadrant Q, having two arms $q$, that form foot-rests and by which the steering is operated. The quadrant Q is supported from the backbone I by a depending bar R, and the quadrant P is suspended from a bar R', attached to the bar R. The rods N are also supported in eyes formed on the ends of rods S, attached to the backbone I, so that the rider having his feet resting upon the arms $q$ by pressing on one side or the other will cause the quadrant Q to be partly rotated and impart a like motion to the quadrant P, thus forcing one of the rods N forward and drawing the other rod back, thus causing the wheel A to be turned in the desired direction.

What I claim is—

1. In a bicycle pawl-carriers attached to the hub of the driving-wheel each of said carriers consisting of a disk having a flange with internal angular recesses, pawls fulcrumed on pins on said disks, a lever fulcrumed to the frame, a forked rod connected at one end to the lower end of the lever and having the outer ends of its arms bent at right angles to engage with the pawls substantially as set forth.

2. In a bicycle a front steering-wheel and rear driving-wheel loose upon its axle connected together by a suitable frame, pawl-carriers secured to the hub of the driving-wheel each of said carriers consisting of a disk having a flange with internal angular recesses, pawls fulcrumed on pins on said disks and adapted to fit into said recesses in combination with a forked rod having its rear end bent inwardly at right angles to engage with the pawls, and its forward end connected to a lever fulcrumed to the frame said lever being forked above its fulcrum and having inwardly-projecting handles and a spring for retaining said lever in its normal position substantially as set forth.

In testimony whereof I have signed my name to this specification, in the presence of two subscribing witnesses, on this 31st day of July, A. D. 1896.

HOSEA W. LIBBEY.

Witnesses:
   CHAS. STEERE,
   EDWIN PLANTA.